United States Patent
Takahata et al.

(10) Patent No.: US 8,911,906 B2
(45) Date of Patent: *Dec. 16, 2014

(54) NON-AQUEOUS ELECTROLYTE TYPE LITHIUM ION SECONDARY CELL

(75) Inventors: Koji Takahata, Toyota (JP); Yukihiro Okada, Shijyonawate (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 208 days.

This patent is subject to a terminal disclaimer.

(21) Appl. No.: 13/388,550

(22) PCT Filed: Aug. 4, 2009

(86) PCT No.: PCT/JP2009/063791
§ 371 (c)(1),
(2), (4) Date: Feb. 2, 2012

(87) PCT Pub. No.: WO2011/016112
PCT Pub. Date: Feb. 10, 2011

(65) Prior Publication Data
US 2012/0129055 A1 May 24, 2012

(51) Int. Cl.
*H01M 10/056* (2010.01)
*H01M 10/0567* (2010.01)
*H01M 10/0568* (2010.01)
*H01M 10/0525* (2010.01)

(52) U.S. Cl.
CPC .......... *H01M 10/0525* (2013.01); *Y02E 60/122* (2013.01); *H01M 10/0567* (2013.01); *H01M 10/0568* (2013.01); *H01M 2220/20* (2013.01); *Y02T 10/7011* (2013.01)
USPC ....................................... 429/337

(58) Field of Classification Search
CPC .............. H01M 10/00; H01M 10/056; H01M 10/0561; H01M 10/0564
USPC ....................................... 429/337
See application file for complete search history.

(56) References Cited

U.S. PATENT DOCUMENTS 6,090,506 A    7/2000 Inoue et al.
2002/0028380 A1*    3/2002 Tanjo et al. .................. 429/209

(Continued)

FOREIGN PATENT DOCUMENTS

CN    1866586    11/2006
CN    1989648    6/2007

(Continued)

OTHER PUBLICATIONS

International Search Report in International Application No. PCT/JP2009/063791; Mailing Date: Nov. 17, 2009.

*Primary Examiner* — Mark F Huff
*Assistant Examiner* — Rashid Alam
(74) *Attorney, Agent, or Firm* — Finnegan, Henderson, Farabow, Garrett & Dunner, LLP

(57) ABSTRACT

There is provided a lithium ion secondary cell excellent in charging and discharging cycle characteristics. A lithium ion secondary cell includes: an electrode body including a positive electrode having a positive electrode active material, a negative electrode having a negative electrode active material, and a separator; and a non-aqueous electrolyte containing a lithium salt as a supporting salt in an organic solvent, the electrode body and the non-aqueous electrolyte being accommodated in a case. The positive electrode active material is a lithium transition metal oxide having a layered structure. The electrolyte contains a compound represented by a chemical formula (I) in an amount of β mol relative to the total content α mol of moisture to be mixed in the cell. β satisfies $-1.3 \leq \log(\beta/\alpha) \leq 1$.

(I)

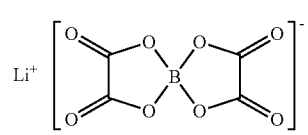

5 Claims, 5 Drawing Sheets

(56) References Cited

U.S. PATENT DOCUMENTS

| | | |
|---|---|---|
| 2006/0019161 A1 | 1/2006 | Issaev et al. |
| 2006/0240322 A1 | 10/2006 | Xu et al. |
| 2006/0286458 A1* | 12/2006 | Sato et al. ............... 429/231.95 |
| 2008/0088278 A1* | 4/2008 | Issaev et al. ................. 320/127 |

FOREIGN PATENT DOCUMENTS

| | | |
|---|---|---|
| JP | 2005-32716 | 2/2005 |
| JP | 2007-27084 | 2/2007 |
| JP | 2007-128723 | 5/2007 |
| JP | 2007-179883 | 7/2007 |
| JP | 2008-34334 | 2/2008 |
| JP | 2008-539548 | 11/2008 |
| JP | 2009-176534 | 8/2009 |
| WO | WO 2011/016113 A1 | 2/2011 |

* cited by examiner

NON-AQUEOUS ELECTROLYTE TYPE LITHIUM ION SECONDARY CELL

CROSS-REFERENCE TO RELATED APPLICATIONS

This application is a national phase application of International Application No. PCT/JP2009/063791, filed Aug. 4, 2009, the contents of which are incorporated herein by reference.

TECHNICAL FIELD

The present invention relates to a lithium ion secondary cell suppressed in increase in internal resistance and having excellent charging and discharging cycle characteristics.

BACKGROUND ART

A lithium ion secondary cell includes positive and negative electrodes capable of reversibly occluding and releasing lithium ions, and an electrolyte interposed between both the electrodes. The lithium ions in the electrolyte come and go between both the electrodes for performing charging and discharging. The energy density is high. For this reason, use thereof has been also studied in the fields requiring a large-capacity power source such as hybrid vehicles and electric cars. Representative examples of the electrolyte for use in a lithium ion secondary cell may include a liquid electrolyte (non-aqueous electrolyte) containing a lithium salt as a supporting salt in a non-aqueous solvent. Representative examples of the supporting salt may include lithium slats including fluorine as a constituent element such as lithium tetrafluoroborate and lithium hexafluorophosphate. Patent Document 1 describes a technology regarding a lithium ion secondary cell using such lithium salts.

Patent Document 1: Japanese Patent Application Laid-open No. 2005-32716

SUMMARY OF INVENTION

Incidentally, when the lithium salt including fluorine as a constituent element as described above reacts with water, the lithium salt may be decomposed to form hydrogen fluoride (HF). HF has a high corrosive property to metals and inorganic oxides. Thus, when HF is formed in the cell, HF corrodes a collector. This and other factors increase the internal resistance, which may cause degradation of the charging and discharging cycle characteristics. For this reason, for the secondary cell using such lithium salts, it is important to prevent the hydrolysis reaction of the lithium salt for suppressing the formation of HF. Patent Document 1 describes the following: to the electrolyte, a salt containing an anion having a dicarboxylic acid group is added as an additive; as a result, the moisture in the cell is consumed, which can suppress the formation of HF. Further, in Patent Document 1, there is a description to the effect that at least a part of the additive is decomposed by a charging treatment, and that the decomposed products are deposited on the surfaces of the positive electrode and/or the negative electrode, but such decomposed products is low in resistance, and stable.

However, a study by the present inventors indicates as follows: use of the additive reversely causes an increase in internal resistance (an increase in initial internal resistance and/or an increase in internal resistance (endurance resistance) due to repetition of the charging and discharging cycle); this may degrade the charging and discharging cycle characteristics.

An object of the present invention is to provide a lithium ion secondary cell effectively suppressed in increase in internal resistance and improved in charging and discharging cycle characteristics by the use of the additive as described above. Further, another object thereof is to provide a method for manufacturing such a lithium ion secondary cell.

The present inventors focused attention on the decomposed products of the additive deposited on the negative electrode surface as a factor which may still cause an increase in internal resistance even when the formation of HF is suppressed by the additive. Then, it has been revealed as follows: the decomposed products cause an increase in negative electrode resistance, so that use of the additive may reversely result in an increase in internal resistance. Thus, the present inventors found a technology capable of suppressing the formation of HF using the additive, and implementing a suppressing effect of an increase in internal resistance, and completed the present invention.

The present invention provides a lithium ion secondary cell, including: an electrode body including a positive electrode having a positive electrode active material, a negative electrode having a negative electrode active material, and a separator, as constituent members; and a non-aqueous electrolyte containing a lithium salt as a supporting salt in an organic solvent, the electrode body and the non-aqueous electrolyte being accommodated in a case. The positive electrode active material contains a layered oxide having lithium and a transition metal as a main component. Herein, the layered oxide means an oxide having a layered crystal structure including two different stacked layers. Further, the supporting salt is a lithium salt containing fluorine as a constituent element (which will be hereinafter also referred to as a fluorine-containing lithium salt). Herein, the lithium salt containing fluorine as a constituent element means a lithium salt in general for use as a supporting salt for a common lithium ion secondary cell, and capable of reacting with water to form HF. The electrolyte further contains, as an additive, a compound represented by the following chemical formula (I):

[Chemical 1]

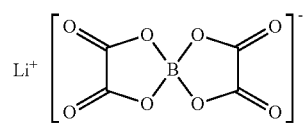
(I)

Herein, the cell is configured such that the case accommodates therein the additive in a number of moles of β satisfying the following mathematical expression (A):

[Mathematical Expression 1]

$$-1.3 \leq \log(\beta/\alpha) \leq 1 \tag{A}$$

where α represents the total number of moles of moisture to be mixed in the case when the cell is assembled.

With such a configuration, the compound represented by the chemical formula (I) (which may be hereinafter referred to as an additive (I)) consumes moisture in the cell. This can suppress the formation of HF due to the reaction between the fluorine-containing lithium salt and moisture. Then, the amount of the additive (I) to be accommodated in the case is set so as to be commensurate with the amount of moisture to be mixed into the case. Accordingly, it is possible to avoid the following situation: the amount of the additive becomes insufficient, which makes it impossible to completely prevent the formation of HF (as a result, the endurance resistance increases). In addition, it is possible to suppress the detrimental effect (increase in initial resistance) due to the excess of the additive. Therefore, it is possible to provide a lithium ion secondary cell suppressed in increase in internal resistance and excellent in charging and discharging cycle characteristics.

In another preferable aspect, the supporting salt is at least one selected from $LiPF_6$, $LiBF_4$, $LiAsF_6$, and $LiSbF_6$.

Such a supporting salt is relatively high in solubility in an organic solvent and lithium ion conductivity. The use thereof with the additive in the aspect herein disclosed suppresses the hydrolysis and the HF formation resulting therefrom. For this reason, the supporting salt can be preferably used for the lithium ion secondary cell of the present invention.

As a still other aspect of the present invention, there is provided a method for manufacturing any lithium ion secondary cell herein disclosed. The method includes the following steps of:

(v) a step of preparing the constituent members of the electrode body;

(w) a step of ascertaining the molar equivalent value $\alpha$ of the total content of moisture which can be mixed in the case;

(x) a step of substituting a value of the $\alpha$ into the mathematical expression (A), and calculating a numerical value range of the $\beta$ satisfying the mathematical expression (A);

(y) a step of preparing the non-aqueous electrolyte, the concentration of the additive in the electrolyte being determined so that the electrolyte accommodated in the case contains the additive in a number of moles within the numerical value range of the $\alpha$ calculated in the step (x); and (z) a step of assembling a lithium ion secondary cell using the constituent members of the electrode body and the electrolyte.

In accordance with this specification, as a preferred aspect of the method, there is provided a method for manufacturing a lithium ion secondary cell that includes the following steps:

(a) a step of preparing the positive electrode, the negative electrode, the separator, and an initial electrolyte serving as constituent members of the cell, respectively, the initial electrolyte including at least a fluorine-containing lithium salt as a supporting salt dissolved in an organic solvent in a prescribed concentration;

(b) a step of ascertaining, based on the content of moisture contained in the positive electrode, the negative electrode, the separator, and the initial electrolyte prepared in the step (a), a molar equivalent value $\alpha$ of the total content of moisture to be mixed in the case due to the constituent members;

(c) a step of substituting a value of the $\alpha$ into the mathematical expression (A), and calculating a numerical value range of the $\beta$ satisfying the mathematical expression (A);

(d) a step of adding the additive in a number of moles within the numerical value range of $\beta$ calculated in the step (c) to the initial electrolyte, and preparing a final electrolyte; and (e) a step of assembling a lithium ion secondary cell under an environment with a dew point of −10° C. or less using the positive electrode, the negative electrode, the separator, and the final electrolyte.

Herein, in the step (a), the positive electrode, the negative electrode, the separator, and the initial electrolyte are prepared, respectively. Alternatively, the previously prepared ones are obtained (purchased or the like).

In the step (b), the contents of moisture present (deposited, dissolved, or the like) on respective members (the positive electrode, the negative electrode, the separator, and the initial electrolyte) of the cell are ascertained, respectively. The total is determined as the total content of moisture to be mixed in the case.

In the step (c), the amount of the additive to be used commensurate with the total moisture content $\alpha$ mol ascertained in the step (b) is referred to as $\beta$ mol. The value of $\alpha$ is substituted into the mathematical expression (A) to calculate the numerical value range of $\beta$.

In the step (d), within the numerical value range of $\beta$ calculated in the step (c), the amount (number of moles) of the additive to be used is appropriately selected. The additive in a mass commensurate therewith is added to the initial electrolyte, thereby preparing a final electrolyte.

In the step (e), in an environment in which external moisture mixing scarcely occurs such as that with a dew point of −10° C. or less, the electrode body is formed using the positive electrode, the negative electrode, and the separator. The electrode body and the final electrolyte are accommodated in a cell case, or the like. Then, the case is subjected to sealing or the like. Thus, a lithium ion secondary cell is assembled.

With such a method, the moisture in the cell is consumed by the additive (I), which can suppress the formation of HF due to the reaction between the fluorine-containing lithium salt and moisture. Then, the amount of the additive (I) to be accommodated in the case is set so as to be commensurate with the amount of moisture to be mixed into the case. Accordingly, it is possible to avoid the following situation: the amount of the additive becomes insufficient, which makes it impossible to completely prevent the formation of HF (as a result, the endurance resistance increases). In addition, it is possible to suppress the detrimental effect (increase in initial resistance) due to the excess of the additive. Therefore, it is possible to provide a lithium ion secondary cell suppressed in increase in internal resistance and excellent in charging and discharging cycle characteristics.

Further, the lithium ion secondary cell herein disclosed has been reduced in initial internal resistance, and can also be suppressed in increase in internal resistance due to repetition of the charging and discharging cycle, and hence is preferable as an onboard cell required to have excellent charging and discharging cycle characteristics. Therefore, in accordance with the present invention, as a still further aspect, there is provided a vehicle including the lithium ion secondary cell herein disclosed.

DESCRIPTION OF EMBODIMENTS

Figure 1:
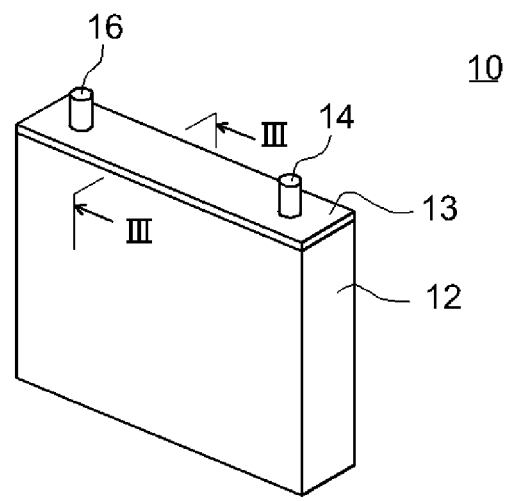
FIG. 1 is a schematic perspective view showing a cell in accordance with one embodiment.

Below, preferred embodiments of the present invention will be described. Incidentally, matters necessary for carrying out the present invention, except matters specifically referred to in the present specification, can be grasped as design matters of those skilled in the art based on the related art in the field. The present invention can be carried out based on the contents disclosed in the present specification and technical common sense in the field.

The technology herein disclosed is applicable to a lithium ion secondary cell which includes an electrode body including a positive electrode containing a lithium transition metal oxide having a layered structure (which may be hereinafter also referred to as a layered lithium transition metal oxide or simply as a layered oxide) as a positive electrode active material, and a negative electrode containing a negative electrode active material, and a separator as constituent members, and a non-aqueous electrolyte containing a fluorine-containing lithium salt as a supporting salt in an organic solvent. The outside shape of the secondary cell can be appropriately changed according to the intended uses, and has no particular restriction. However, the outside shape may be an outside shape such as a rectangular parallelepiped-like shape, a flat shape, or a cylindrical shape. Further, the shape of the electrode body can vary according to the shape of the secondary cell and the like, and hence has no particular restriction. For example, there can be preferably adopted an electrode body including sheet-like positive electrode and negative electrode wound together with sheet-like separators. Below, the present invention will be described more specifically with a lithium ion secondary cell of such an embodiment as an example. However, the applicable objects of the present invention are not limited to such cells and manufacturing thereof.

As a preferable applicable object of the technology herein disclosed, mention may be made of a lithium ion secondary cell using an electrolyte containing a supporting salt capable of reacting with water and forming HF. Specific examples of such a supporting salt may include $LiPF_6$, $LiBF_4$, $LiAsF_6$, and $LiSbF_6$. The lithium salts have a relatively high lithium ion conductivity, and hence are preferable. Out of these, $LiPF_6$ and $LiBF_4$ can be preferably used because relatively low-priced and high-purity commercially available products are available. The concentration of the supporting salt in the electrolyte has no particular restriction, and, for example, can be set equal to the concentration of the electrolyte for use in a conventional lithium ion secondary cell. Generally, there can be preferably used a non-aqueous electrolyte containing a supporting salt in a concentration of about 0.1 mol/L to 5 mol/L (e.g., about 0.8 mol/L to 1.5 mol/L).

Further, as the organic solvents (non-aqueous solvents) to be used for the non-aqueous electrolytes, there can be preferably used aprotic solvents such as carbonates, esters, ethers, nitriles, sulfones, and lactones. There can be used organic solvents commonly used for a lithium ion secondary cell, such as ethylene carbonate (EC), propylene carbonate (PC), diethyl carbonate (DEC), dimethyl carbonate (DMC), ethylmethyl carbonate (EMC), 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, and γ-butyrolactone (BL), independently alone or in combination of two or more thereof.

With the technology herein disclosed, the non-aqueous electrolyte contains, in addition to the supporting salt (fluorine-containing lithium salt), a compound expressed by the chemical formula (I) in a proper amount as an additive. The amount of the additive used is set within the range capable of effectively implementing reduction of the initial resistance and suppression of an increase in internal resistance. The range can be calculated from the total moisture content which can be mixed into the cell manufactured. Therefore, with the technology herein disclosed, there is prepared an initial electrolyte prepared so as to contain the supporting salt in a desired concentration in an organic solvent. Thus, the total content of moisture which may be mixed into the cell is ascertained. Then, an additive in an amount commensurate with the total moisture content is added to the initial electrolyte to prepare a non-aqueous electrolyte (final electrolyte).

Generally, a lithium ion secondary cell to be the applicable object of the technology herein disclosed is assembled in a highly dried environment (e.g., with a dew point of −10° C. or less (typically −10 to −50° C.), preferably a dew point of −20 to −50° C., and more preferably a dew point of about −30° C. to −50° C.). For this reason, mixing of moisture from the environment is to such a degree as to hardly exert an influence. Thus, mixing of moisture into the cell can be regarded as the one mainly brought by the members (typically, the positive electrode, the negative electrode, the separator, and the electrolyte) forming the cell. Therefore, the total content a mol of moisture which may be mixed from the members into the cell can be determined in the following manner. The moisture contents (mol) of respective members in amounts used for cell manufacturing are ascertained, and these are summed up. The moisture content of each of the members is typically calculated from a value obtained by quantifying the moisture content (mol/g) per unit mass present on (deposited on, dissolved in, or the like) the member.

As the method for quantifying the moisture content per unit mass of each member, there is used a method capable of quantifying a trace amount of moisture. For example, the Karl Fischer's method can be preferably adopted. For example, a sample is collected from each member of a positive electrode sheet, a negative electrode sheet, a separator, and an electrolyte (initial electrolyte). The moisture content contained in the sample is quantified by means of a moisture meter (Karl Fischer moisture meter, or the like). Thus, the moisture content (mol/g) per unit mass of the member can be determined.

Also for other members (a cell case, a terminal, and the like) than the members, the moisture contents can be similarly quantified. However, when the surface areas of other members such as the cell case and the terminal are remarkably smaller relative to the surface areas of the members (the positive electrode, the negative electrode, and the separator), as with, for example, the wound electrode body, the moisture contents of the other members can be omitted to be added to the total moisture content as the one scarcely exerting influences. Similarly, the moisture content adsorbed on the collector exposed part of each electrode sheet is also generally negligible.

Incidentally, the member of which the moisture content per unit mass was quantified is stored in an environment in which further moisture mixing is substantially not caused. Then, at this step, another cell is manufactured using a part of the member, the moisture content per unit mass quantified before storage may be adopted in order to ascertain the moisture content of the member. Namely, when the moisture content of the member is kept roughly constant (e.g., when the members are produced in the same lot, and stored in an environment in which external moisture mixing hardly can occur), the moisture content per unit mass is once quantified. Then, in subsequent cell manufacturing, the same value can be adopted to ascertain the moisture content of the member. Namely, in second or later cycle of cell manufacturing, the quantification of the moisture content per unit mass can be appropriately omitted. The same also applies to the case where the content of moisture to be brought into the case can be predicted (ascertained) from the information such as the past actual results.

With the technology herein disclosed, the amount of the additive (I) to be added to the non-aqueous electrolyte can be appropriately selected within the range of the numerical value of $\beta$ (mol) determined by substituting the total moisture content a calculated in the foregoing manner into the mathematical expression (A). Herein, the common logarithm ($\log(\beta/\alpha)$) of the value ($\beta/\alpha$) of the mole ratio of the amount of the additive used to the total moisture content is roughly within the range of −1.3 to +1, and preferably can be set within the range of −0.5 to +0.6. The value of $\beta$ is determined based on the value of $\alpha$ so that the $\log(\beta/\alpha)$ falls within the range. This suppresses an increase in initial internal resistance, which can also further suppress an increase in internal resistance (endurance resistance) due to repetition of the charging and discharging cycle. When the value of the $\log(\beta/\alpha)$ is too smaller than the foregoing range, the HF formation suppressing effect cannot be obtained sufficiently. As a result, the endurance resistance may increase. Whereas, when the value is too larger than the foregoing range, the amount of decomposed products deposited on the negative electrode surface increases. As a result, the internal resistance (initial internal resistance) may increase.

Below, an embodiment of a lithium ion secondary cell including the wound electrode body will be further specifically described by reference to the schematic views shown in FIGS. 1 to 3. As shown, a lithium ion secondary cell 10 in accordance with the present embodiment includes a case 12 made of a metal (also preferably made of a resin or made of a laminate film). In the case 12, there is accommodated a wound electrode body 20 formed by stacking a long positive electrode sheet 30, a separator 50A, a negative electrode sheet 40, and a separator 50B in this order, and then winding them in a flat form.

The positive electrode sheet 30 can be manufactured by, for example, coating and drying a positive electrode mixture on at least one side (preferably both sides) of a positive electrode collector 32, and forming a positive electrode mixture layer 35. As the positive electrode mixture, there can be used a paste-like or slurry-like composition obtained by dispersing a layered oxide as the positive electrode active material in a proper solvent, if required, together with a conductive material, a binder, and the like. As the positive electrode collector 32, there is preferably used a conductive member including a metal with good conductivity. For example, there can be preferably used aluminum or an alloy including aluminum as the main component. The shape of the positive electrode collector can vary according to the shape of the lithium ion secondary cell or the like, and hence has no particular restriction. The shapes may be various forms such as rod form, plate form, sheet form, foil form, and mesh form. In the present embodiment, a sheet-like positive electrode collector can be preferably adopted.

As the layered oxide, there can be appropriately selected and used an oxide having a composition including lithium and a transition metal, and having a layered structure. For example, preferred is use of one, or two or more layered oxides selected from layered lithium nickel type oxides and layered lithium cobalt type oxides.

Herein, the "layered lithium nickel type oxides" are intended to embrace, other than layered oxides including Li and Ni as constituent metal element, even composite oxides each including other one, or two or more metal elements than Li and Ni (i.e., transition metal elements other than Li and Ni and/or main group metal elements) in a content equal to or smaller than that of Ni in terms of number of atoms (typically, a content smaller than that of Ni; when two or more metal elements other than Li and Ni are included, a content equal to or smaller than that of Ni, or smaller than that of Ni for any of them), and having a layered structure with stability. Such metal elements can be one, or two or more elements selected from the group consisting of, for example, Co, Al, Mn, and Mg. Similarly, the "layered lithium cobalt type oxides" are intended to embrace even composite oxides each including other one, or two or more metal elements than Li and Co in a content equal to or smaller than that of Co (typically, a content smaller than that of Co), and having a layered structure with stability. As particularly preferred positive electrode active materials, there are exemplified layered oxides including three kinds of transition metal elements (which is also referred to as tertiary lithium oxides).

As such layered lithium transition metal oxides, there can be used, for example, those manufactured or provided with conventional known methods as they are.

As the conductive materials, there are preferably used conductive powder materials such as carbon powders and carbon fibers. As the carbon powders, preferred are various carbon blacks such as acetylene black, furnace black, Ketjen black, and graphite powder. The conductive materials can be used independently alone, or in combination of two or more thereof. The amount of the conductive material included in the positive electrode mixture may be appropriately selected according to the kind and the amount of the positive electrode active material.

The binders can be appropriately selected from, for example, water-soluble polymers dissolving in water, polymers dispersed in water, polymers dissolving in a non-aqueous solvent (organic solvent), and the like to be used. Further, these may be used independently alone, or may be used in combination of two or more thereof.

Examples of the water-soluble polymers may include carboxymethylcellulose (CMC), methylcellulose (MC), cellulose acetate phthalate (CAP), hydroxypropyl methylcellulose (HPMC), hydroxypropyl methylcellulose phthalate (HPMCP), and polyvinyl alcohol (PVA).

Examples of the water-dispersible polymers may include fluorine-containing resins such as polytetrafluoroethylene (PTFE), tetrafluoroethylene-perfluoroalkyl vinyl ether copolymer (PFA), tetrafluoroethylene-hexafluoropropylene copolymer (FEP), and ethylene-tetrafluoroethylene copolymer (ETFE), vinyl acetate copolymer, styrene butadiene block copolymer (SBR), acrylic acid-modified SBR resin (SBR type latex), and rubbers such as gum arabic.

Examples of the polymers dissolving in a non-aqueous solvent (organic solvent) may include polyvinylidene fluoride (PVDF), polyvinylidene chloride (PVDC), polyethylene oxide (PEO), polypropylene oxide (PPO), and polyethylene oxide-propylene oxide copolymer (PEO-PPO).

The amount of the binder to be added may be appropriately selected from the type and the amount of the positive electrode active material.

Whereas, the negative electrode sheet 40 can be manufactured by, for example, coating and drying a negative electrode mixture on at least one side (preferably both sides) of a negative electrode collector 42, and forming a negative electrode mixture layer 45. As the negative electrode mixture, there can be used a paste-like or slurry-like composition obtained by dispersing a negative electrode active material in a proper solvent, if required, together with a binder, and the like. As the negative electrode collector 42, there is preferably used a conductive member including a metal with good conductivity. For example, there can be used copper or an alloy including copper as the main component. The shape of the negative electrode collector 42 can vary according to the shape of the lithium ion secondary cell or the like, and hence has no particular restriction. The shapes may be various forms such as rod form, plate form, sheet form, foil form, and mesh form. In the present embodiment, the sheet-like negative electrode collector 42 made of copper is used, and can be preferably used for the lithium ion secondary cell 10 including the wound electrode body 20.

As the negative electrode active materials, one, or two or more of materials conventionally used for a lithium ion secondary cell can be used without particular restriction. For example, as preferred negative electrode active materials, carbon particles may be mentioned. There can be preferably used particulate carbon material (carbon particles) including a graphite structure (layered structure) at least in a part thereof. There can be preferably used any carbon material of a so-called graphite one (graphite), a hardly graphitizable carbonaceous one (hard carbon), and easily graphitizable carbonaceous one (soft carbon), and the one having a combined structure thereof. Out of these, particularly, graphite particles of natural graphite and the like can be preferably used.

For the binder, the same ones as those for the positive electrode can be used independently alone, or in combination of two or more thereof. Although not particularly restricted, the amount of the binder to be used per 100 parts by mass of the negative electrode active material can be set, for example, within the range of 0.5 to 10 parts by mass.

Further, as the separators 50A and 50B to be used in a manner stacked with the positive electrode sheet 30 and the negative electrode sheet 40, there can be preferably used a porous film including a polyolefin type resin such as polyethylene or polypropylene. The film may be a monolayer or a multilayer. For the two sheets of separators 50A and 50B, the same one may be used, or different ones may be used.

Figure 2:
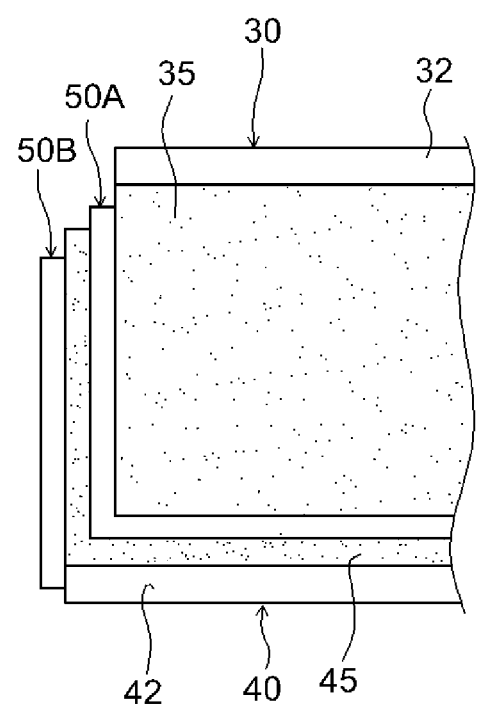
FIG. 2 is a schematic plan view showing positive and negative electrodes and a separator forming the cell in accordance with one embodiment.

As shown in FIG. 2, at a first end along the longitudinal direction of the positive electrode sheet 30, the positive electrode mixture layer 35 is not formed (or has been removed after formation), so that the positive electrode collector 32 is exposed. Also for the negative electrode sheet 40, similarly, at a first end thereof, the negative electrode collector 42 is exposed. The positive and negative electrode sheets 30 and 40 are stacked with the separators 50A and 50B to form a laminate. At this step, the positive and negative electrode sheets 30 and 40 are stacked in slight misalignment therebetween so that the first end (positive electrode collector exposed part) of the positive electrode sheet and the first end (negative electrode collector exposed part) of the negative electrode sheet are disposed symmetrically with respect to the axis in the longitudinal direction of the laminate, and so that both the mixture layers 35 and 45 are stacked one on another. The laminate is wound. Then, the resulting wound body is crushed from the side direction to be flattened. This results in the flat-shaped wound electrode body 20.

Figure 3:
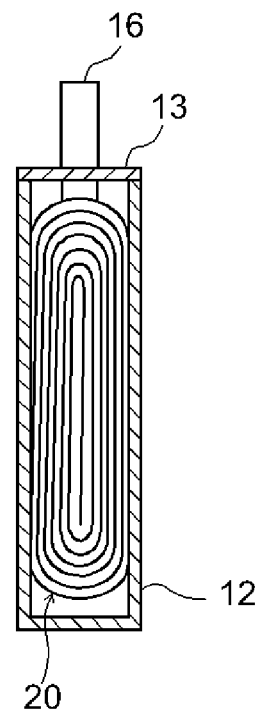
FIG. 3 is a cross-sectional view along line of FIG. 1.

The resulting wound electrode body 20 is accommodated in the case 12 (FIG. 3). In addition, electric connections are established between the exposed part of the positive electrode collector 32 and an external connection positive electrode terminal 14, and between the exposed part of the negative electrode collector 42 and an external connection negative electrode terminal 16, respectively. At this step, it is configured such that the terminals are partially disposed outside the case 12. Then, the non-aqueous electrolyte (final electrolyte) is disposed (injected) into the case 12. The opening of the case 12 is sealed by welding between the case and a lid member 13 corresponding thereto, or the like. Thus, assembly of the lithium ion secondary cell 10 is completed. Incidentally, sealing of the case 12 and disposition of the electrolyte can be performed in the same manner as with the method performed in manufacturing of a conventional lithium ion secondary cell.

Figure 5:
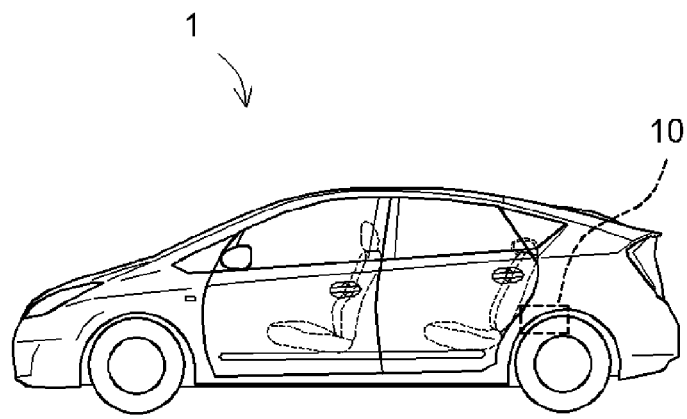
FIG. 5 is a side view schematically showing a vehicle (car) including a lithium ion secondary cell of the present invention.

The lithium ion secondary cell in accordance with the present invention has excellent charging and discharging cycle characteristics as described above. For this reason, the secondary cell can be preferably used as a powder source for a motor (electric motor) to be mounted in a vehicle such as a car. Such secondary cells may also be used in the form of an assembled battery including a plurality of them connected in series and/or in parallel. Therefore, the present invention provides, as schematically shown in FIG. 5, a vehicle (typically, a car, particularly, a car including an electric motor such as a hybrid car, an electric car, or a fuel cell car) 1 including such a lithium ion secondary cell (which may be in the form of an assembled battery) 10 as a power source.

Below, a description will be given to some examples regarding the present invention. However, it is not intended that the present invention be limited to such specific examples.

Example 1

Preparation of Cell Member

As a positive electrode mixture, a positive electrode active material, carbon black (CB) as a conductive material, and PVDF as a binder were mixed with N-methyl-2-pyrrolidone (NMP) so that the mass ratio of the materials was 85:10:5, and so that the solid content concentration (NV) was roughly 50 mass %. As a result, a slurry-like composition was prepared.

Herein, as a positive electrode active material, there was used a powder-like lithium-nickel-cobalt-manganese type oxide ($LiNi_{1/3}Co_{1/3}Mn_{1/3}O_2$) with an average particle diameter of 8 μm, a specific surface area of 1.0 m²/g, and a theoretical discharge capacity of about 140 mA/g. The oxide has a layered crystal structure. Further, as the CB, acetylene black (AB) was used.

The positive electrode mixture was coated and dried on both the sides of long aluminum foil (positive electrode collector) with a thickness of about 15 μm. The coating amount (in terms of NV) of the positive electrode mixture was adjusted so as to be about 160 g/m² in total for both sides. After drying, pressing was performed so that the overall thickness was about 80 μm, resulting in a positive electrode sheet.

As the negative electrode mixture, a natural graphite power, SBR, and CMC were mixed with ion exchange water so that the mass ratio of the materials was 98:1:1, and so that NV was 45 mass %. As a result, a slurry-like composition was prepared. The negative electrode mixture was coated and dried on both the sides of long copper foil (negative electrode collector) with a thickness of about 10 μm. The coating amount (in terms of NV) of the negative electrode mixture was adjusted so as to be about 80 g/m² in total for both sides. After drying, pressing was performed so that the overall thickness was 65 μm, resulting in a negative electrode sheet.

The non-aqueous electrolyte (initial electrolyte) was prepared by dissolving $LiPF_6$ as a supporting salt in a mixed solvent containing EC, DMC, and EMC in a volume ratio of 1:1:1 in a concentration of 1 mol/L.

As the separators, there were prepared two long porous polyethylene sheets with a thickness of 20 μm.

[Quantification of Total Moisture Content]

Each moisture content per unit area was quantified for the positive electrode sheet, the negative electrode sheet, the electrolyte, and the separator was quantified in the foregoing manner. Incidentally, as samples, there were used 1 g of the positive electrode, 1 g of the negative electrode, 1 g of the electrolyte, and 0.2 g of the separator. For the moisture meter, there was used Karl Fischer moisture meter (model "AQ-7" manufactured by HIRANUMA SANGYO Co., Ltd.).

The total content of moisture which can be mixed into a 18650 model cell described later (i.e., the total moisture content of respective members for use in manufacturing of the cell) was calculated from the quantified values. As a result, the total moisture content was 0.01111 mol. Herein, the amounts of respective members for use in manufacturing of a cell 100 were 7 g for the positive electrode sheet, 7 g for the negative electrode sheet, 1 g for the (two) separators, and 8 g for the initial electrolyte.

[Preparation of Final Electrolyte]

To the initial electrolyte, was added lithium bis(oxalato)borate (LiBOB) (the compound of the chemical formula (I)) in an amount of 0.00060 mol (0.116 g) as an additive, thereby to prepare a final electrolyte.

[Manufacturing of Cell]

Figure 6:
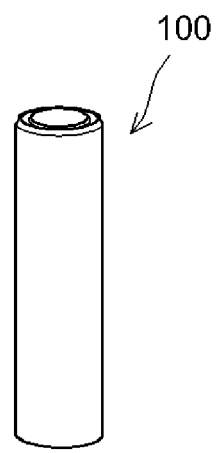
FIG. 6 is a perspective view illustrating a schematic shape of a 18650 model lithium ion secondary cell.

Using the members, a 18650 model (cylinder type 18 mm in diameter and 65 mm in height) lithium ion secondary cell 100 (see FIG. 6) was manufactured in the following procedure.

Namely, the positive electrode sheet and the negative electrode sheet were stacked together with the two sheets of separators as shown in FIG. 2. The laminate was wound in the longitudinal direction to manufacture a wound electrode body. The electrode body was accommodated together with the final electrolyte in a cylindrical container. The container was sealed to form the lithium ion secondary cell 100. Then, as an initial charging treatment, an operation of performing 3-hour constant current charging at a rate of 1/10 C, and then, performing charging up to 4.1 V at a rate of 1/3 C and an operation of performing discharging down to 3.0 V at a rate of 1/3 C were repeated three times. As a result, a cell in accordance with Example 1 was obtained.

Example 2

A positive electrode sheet, a negative electrode sheet, an initial electrolyte, and separators were prepared in the same manner as in Example 1. The total content of moisture which can be mixed into a cell was quantified, and was found to be 0.00278 mol. In the present example, to the initial electrolyte, was added LiBOB in an amount of 0.00090 mol (0.174 g), thereby to prepare a final electrolyte.

Using the members, a cell was formed, and an initial charging treatment was performed in the same manner as in Example 1. As a result, the cell in accordance with Example 2 was obtained.

Example 3

A positive electrode sheet, a negative electrode sheet, an initial electrolyte, and separators were prepared in the same manner as in Example 1. The total moisture content was quantified, and was found to be 0.00167 mol. In the present example, to the initial electrolyte, was added LiBOB in an amount of 0.00196 mol (0.380 g), thereby to prepare a final electrolyte.

Using the members, a cell was formed, and an initial charging treatment was performed in the same manner as in Example 1. As a result, the cell in accordance with Example 3 was obtained.

Example 4

A positive electrode sheet, a negative electrode sheet, an initial electrolyte, and separators were prepared in the same manner as in Example 1. The total moisture content was quantified, and was found to be 0.00111 mol. In the present example, to the initial electrolyte, was added LiBOB in an amount of 0.00392 mol (0.760 g), thereby to prepare a final electrolyte.

Using the members, a cell was formed, and an initial charging treatment was performed in the same manner as in Example 1. As a result, the cell in accordance with Example 4 was obtained.

Example 5

A positive electrode sheet, a negative electrode sheet, an initial electrolyte, and separators were prepared in the same manner as in Example 1. The total moisture content was quantified, and was found to be 0.00067 mol. In the present example, to the initial electrolyte, was added LiBOB in an amount of 0.00588 mol (1.14 g), thereby to prepare a final electrolyte.

Using the members, a cell was formed, and an initial charging treatment was performed in the same manner as in Example 1. As a result, the cell in accordance with Example 5 was obtained.

Example 6

A positive electrode sheet, a negative electrode sheet, an initial electrolyte, and separators were prepared in the same manner as in Example 1. The total moisture content was quantified, and was found to be 0.02778 mol. In the present example, to the initial electrolyte, was added LiBOB in an amount of 0.00030 mol (0.0581 g), thereby to prepare a final electrolyte.

Using the members, a cell was formed, and an initial charging treatment was performed in the same manner as in Example 1. As a result, the cell in accordance with Example 6 was obtained.

Example 7

A positive electrode sheet, a negative electrode sheet, an initial electrolyte, and separators were prepared in the same manner as in Example 1. The total moisture content was quantified, and was found to be 0.00028 mol. In the present example, to the initial electrolyte, was added LiBOB in an amount of 0.00783 mol (1.52 g), thereby to prepare a final electrolyte.

Using the members, a cell was formed, and an initial charging treatment was performed in the same manner as in Example 1. As a result, the cell in accordance with Example 7 was obtained.

[Measurement of Initial Internal Resistance]

Respective cells were adjusted to a SOC (State of Charge) of 60%. At a temperature of 25° C., respective currents (I) of 0.2 A, 0.4 A, 0.6 A, and 1.2 A were passed therethrough to measure respective cell voltages (V) after 10 seconds. The current value (I) passed through each cell (X axis) and the voltage value V (Y axis) were subjected to linear regression. From the slope, the initial IV resistance (mΩ) was determined.

[Charging and Discharging Cycle Test]

For each cell, at 60° C., an operation of performing charging at a rate of 2 C until the inter-terminal voltage becomes 4.1

V, and an operation of performing discharging at the same rate of 2 C from 4.1 V to 3.0 V are referred as one charging and discharging cycle. This was repeated 500 cycles.

[Internal Resistance Increase Rate]

For each cell after the charging and discharging cycle test, the IV resistance (mΩ) at 25° C. was measured in the same manner as with the measurement of the initial internal resistance. Thus, the internal resistance increase rate (%) was determined as the percentage of the IV resistance value at the time point of completion of the cycle test with respect to the initial IV resistance value.

For each of the cells 1 to 7, the measured initial internal resistance value (mΩ), and internal resistance increase rate (%) are shown together with the total moisture content α (mol), the additive amount β (mol), and the value of log(β/α) in Table 1. Further, the relationships between the log(β/α) and the initial internal resistance value (mΩ) (left Y axis) and the internal resistance increase rate (%) (right Y axis) are shown in FIG. 4.

TABLE 1

| Ex. | Total moisture content α (mol) | Additive amount β (mol) | log (β/α) | Initial resistance (mΩ) | Resistance increase rate (%) |
|---|---|---|---|---|---|
| 1 | 0.01111 | 0.00060 | −1.268 | 70 | 110 |
| 2 | 0.00278 | 0.00090 | −0.489 | 66 | 104 |
| 3 | 0.00167 | 0.00196 | 0.070 | 65 | 103 |
| 4 | 0.00111 | 0.00392 | 0.547 | 66 | 101 |
| 5 | 0.00067 | 0.00588 | 0.945 | 70 | 102 |
| 6 | 0.02778 | 0.00030 | −1.967 | 73 | 140 |
| 7 | 0.00028 | 0.00783 | 1.450 | 82 | 101 |

Figure 4:
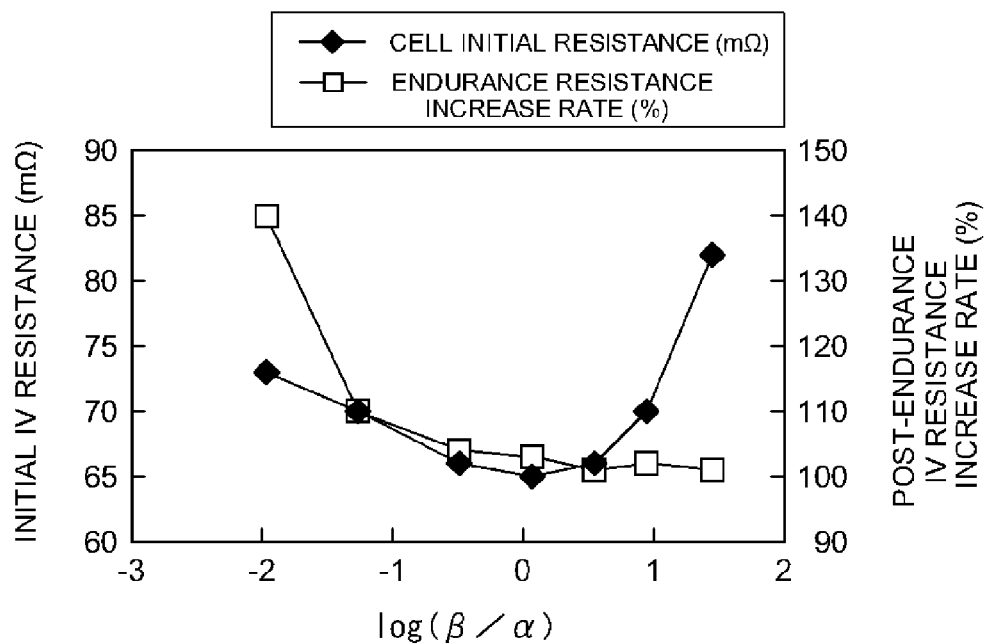
FIG. 4 is a graph plotting the initial internal resistance of the cell and the internal resistance increase rate after a charging and discharging cycle test in terms of the relationship between the additive amount and the total moisture content.

As shown in Table 1 and FIG. 4, for the cells 1 to 5 each with a log(β/α) within the range of −1.3 to +1, all the initial internal resistances were as low as 70 mΩ or less as compared with the cells 6 and 7 each with a log(β/α) outside the range. Further, the cells 1 to 5 were lower in internal resistance increase rate than the cell 6 by as much as about 30 to 40%. Out of these, for each of the cells 2 to 4 with a log(β/α) within the range of −0.5 to +0.6, the initial internal resistance was about 65 mΩ, and the internal resistance increase rate was 105% or less. Thus, the initial internal resistance and the endurance resistance increase rate were both reduced, and the internal resistance suppressing effect was implemented.

Up to this point, specific examples of the present invention were described in details. However, these are merely examples, and do not limit the scope of the appended claims. The technologies described in the claims include various modifications and changes of the specific examples exemplified up to this point.

REFERENCE SIGNS LIST

1 Vehicle (Car)
10 Lithium ion secondary cell
20 Wound electrode body
30 Positive electrode sheet (positive electrode)
32 Positive collector
35 Positive electrode mixture layer
40 Negative electrode sheet (negative electrode)
42 Negative collector
45 Negative electrode mixture layer
50A, 50B Separator

The invention claimed is:

1. A method for manufacturing a lithium ion secondary cell, wherein the lithium ion secondary cell comprises:
an electrode body including a positive electrode having a positive electrode active material, a negative electrode having a negative electrode active material, and a separator, as constituent members; and a non-aqueous electrolyte containing a lithium salt as a supporting salt in an organic solvent, the electrode body and the non-aqueous electrolyte being accommodated in a case, the method comprising:
(a) preparing the positive electrode, the negative electrode, the separator, and an initial electrolyte serving as constituent members of the cell, the positive electrode active material including, as a main component, a layered oxide containing lithium and a transition metal as constituent metal elements, the initial electrolyte including, as a supporting salt, a lithium salt containing fluorine as a constituent atom, and the supporting salt being dissolved in an organic solvent in a prescribed concentration;
(b) ascertaining, based on the content of moisture contained in the positive electrode, the negative electrode, the separator, and the initial electrolyte prepared in the step (a), a molar equivalent value α of the total content of moisture to be mixed in the case due to the constituent members;
(c) substituting a value of the α into the following mathematical expression (A), and calculating a numerical value range of β satisfying the mathematical expression (A)

$$-1.3 \leq \log(\beta/\alpha) \leq 1 \qquad (A)$$

wherein α represents the total number of moles of moisture to be mixed in the case when the cell is assembled;
(d) adding as an additive, a compound represented by the following chemical formula (I):

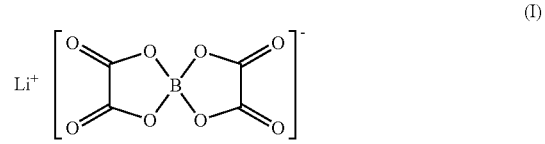

(I)

in a number of moles within the numerical value range of the β calculated in the step (c) to the initial electrolyte, and preparing a final electrolyte; and
(e) assembling a lithium ion secondary cell under an environment with a dew point of −10° C. or less using the positive electrode, the negative electrode, the separator, and the final electrolyte.

2. The method for manufacturing according to claim 1, wherein a numerical value range of the β satisfies −0.5≤log (β/α)≤0.6.

3. The method according to claim 1, wherein the negative electrode active material comprises carbon material.

4. The method according to claim 1, wherein the supporting salt is at least one chosen from $LiPF_6$, $LiBF_4$, $LiAsF_6$, and $LiSbF_6$.

5. The method according to claim 1, wherein in step (e), the dew point ranges from −20° C. to −50° C.

* * * * *